United States Patent [19]

Deiss

[11] Patent Number: 4,581,644
[45] Date of Patent: Apr. 8, 1986

[54] VIDEO BUS
[75] Inventor: Michael S. Deiss, Indianapolis, Ind.
[73] Assignee: RCA Corporation, Princeton, N.J.
[21] Appl. No.: 508,594
[22] Filed: Jun. 28, 1983
[51] Int. Cl.[4] .......................................... H04N 5/268
[52] U.S. Cl. ................................................. 358/181
[58] Field of Search .................. 358/181, 194, 86, 93, 358/185, 310, 335; 455/3, 133, 140

[56] References Cited

U.S. PATENT DOCUMENTS

| 4,276,562 | 6/1981 | Stewart | 358/181 |
|---|---|---|---|
| 4,337,480 | 1/1982 | Bourassin et al. | 358/93 |
| 4,338,632 | 7/1982 | Falater | 358/194 |
| 4,400,735 | 8/1983 | Strammello, Jr. | 358/181 |
| 4,456,928 | 6/1984 | Guillon et al. | 358/181 |
| 4,492,937 | 1/1985 | Theriault | 307/243 |
| 4,502,026 | 2/1985 | Imazeki | 358/181 |

FOREIGN PATENT DOCUMENTS 53-121601 10/1978 Japan .
2072407A 9/1981 United Kingdom .

OTHER PUBLICATIONS

Radio Shack, Video Selector, Cat. No. 15-1261, 1983 Catalog.
Telka S. Perry, "Component Television", published in IEEE Spectrum, Jun. 1983, pp. 38-43.
Instructions for TS-2B Video Audio Switcher, IB31181, published 1965 by RCA Corporation, Camden, NJ.
Page 13 of the RCA Selectavision Video Disc Player SGT 250 Owner's Manual, published by RCA Corporation in 1982.
RCA Service Data for Selectavision Video Disc Player Model SGT 250, published by RCA Corporation in 1982, (p. 51).
RCA Service Data for Video Cassette Recorder Model TDP 1000, published by RCA Corporation in 1980, (pp. 7-49 and 7-54).

Primary Examiner—Tommy P. Chin
Attorney, Agent, or Firm—Eugene M. Whitacre; Peter M. Emanuel; Lawrence C. Edelman

[57] ABSTRACT

A video component interconnection system includes a single signal conductor video bus serially coupled between each of the video components for conducting video signal between the components. A switch located in series with the video bus separates the continuity of the video bus when it is non-conductive. A shunt switch arrangement coupled to the video bus at its junction with the series switch, applies an impedance substantially equal to the characteristic impedance of the video bus between the video bus and a reference potential, when the series switch separates the continuity of the video bus, in order to reduce ghost-producing reflections.

5 Claims, 3 Drawing Figures

VIDEO BUS

FIELD OF THE INVENTION

The present invention relates to an interconnection arrangement for a component video system and more particularly to a signal bus connection arrangement for selectively distributing video signal among the various video components.

BACKGROUND OF THE INVENTION

With the increased popularity of various home entertainment video components, such as video disc and tape players, home computers and satellite TV receivers, the interconnection of these components has become more complex.

One interconnection method is to manually connect cables between the components which are presently to be used. This method is obviously unsatisfactory due to the manual re-arranging of cables required each time it is desired to operate the system in a different manner.

Another approach is to couple each component to a plurality of switches, which may be centrally located or distributed. The switches can be manually or remotely controlled to route the various video signals between specific ones of the components to enable the system to operate as desired by the user. Although this approach is more satisfactory than the first, it requires extensive cable connections to the switches, which are unsightly, subject to signal discontinuity because of the many connections and somewhat complicated for the user to set-up and control. Additionally, the complexity of this type of system increases with the addition of future components.

U.S. patent application Ser. No. 508,605 entitled A Distributed Switched Component Audio/Video System filed concurrently with the present application in the name of B. W. Beyers, describes an audio/video component interconnection system including a video signal conductor having a given characteristic impedance for transferring video signal in a serial manner among the video components. A switch located in series with the video conductor, when non-conductive, separates the continuity of the video conductor into first and second segments so as to allow simultaneous and independent video signal distribution among the video components associated with the first and second segments.

It is herein recognized that when the continuity of the video signal conductor in the above described system is interrupted, provision must be made for proper impedance levels at the discontinuity presented by the non-conductive switch in order to minimize undesired signal reflections.

SUMMARY OF THE INVENTION

In accordance with the principles of the present invention, a shunt switch arrangement coupled to the video conductor at the junction of the video signal conductor and the series switch, applies a predetermined impedance, preferably substantially equal to the characteristic impedance of the video signal conductor, between the conductor and a reference potential. The shunt switch is conductive when the series switch is non-conductive.

DESCRIPTION OF THE PREFERRED EMBODIMENTS

Figure 1:
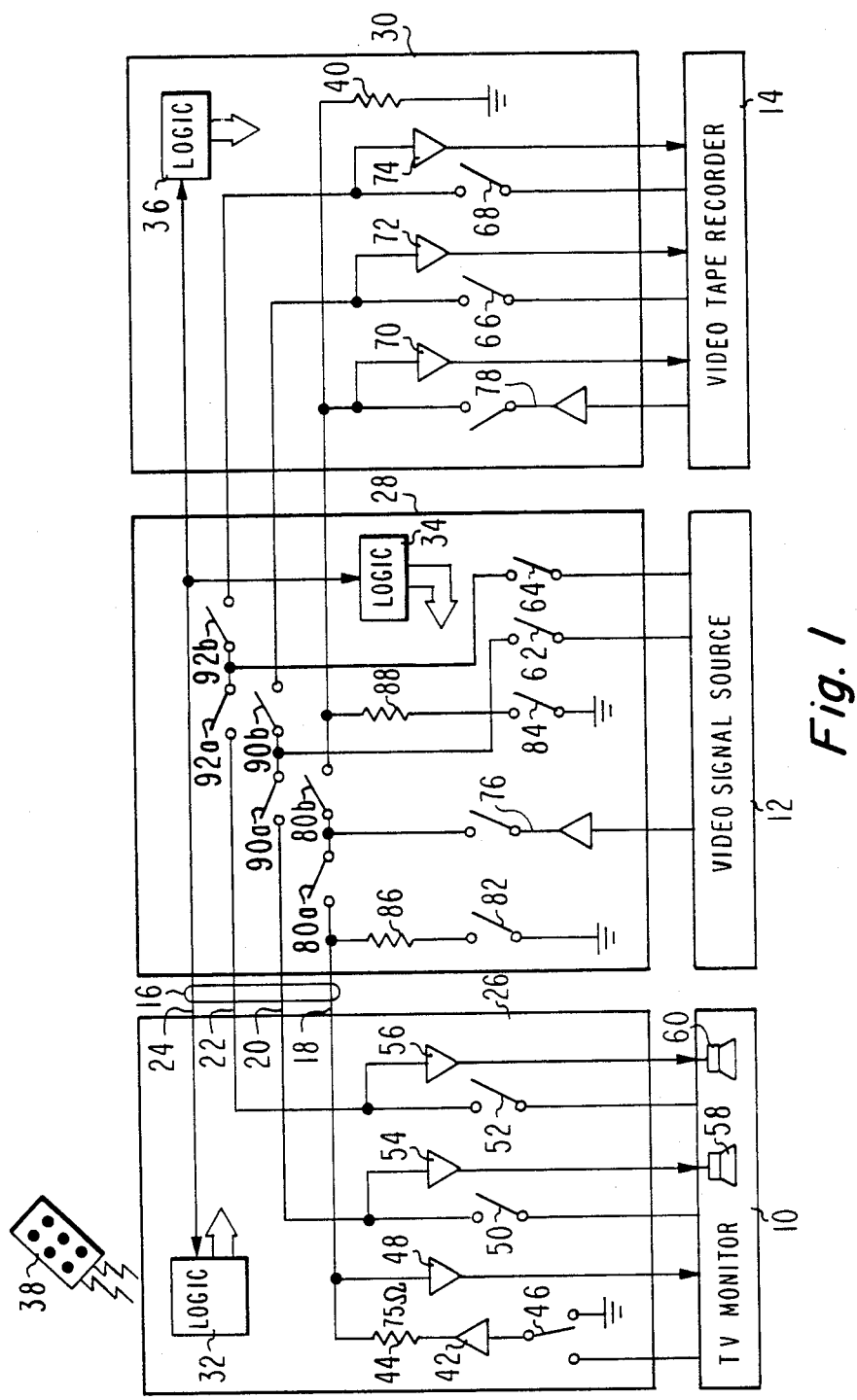
FIG. 1 illustrates partially in block diagram form and partially in schematic diagram form a video component interconnection system constructed in accordance with the principles of the invention.

Referring to FIG. 1, a plurality of video components are shown, each component having an associated connection stage for controlling the transmission and/or reception of video and audio signals to or from other ones of the video components. More specifically, a TV monitor 10, a video signal source 12 and a video tape recorder 14 are shown as examples of typical home video components. Video signal source 12 may comprise a TV tuner and a detector for providing baseband video signals and stereophonic left and right audio signals.

A single cable 16, including only three signal conductors or buses and a control signal conductor or bus, serves to couple the video and audio signals between each component, so as to interconnect the component entertainment system in a "daisy-chain" manner (i.e., cable 16 connects one component to the next in serial fashion). Cable 16 includes a shielded conductor signal bus 18 having a 75 ohm characteristic impedance (i.e., bus 18 is a 75 ohm coaxial cable) for distributing a baseband video signal, two shielded conductor signal buses 20 and 22 for distributing the stereophonic left and right audio signals and a digital control signal bus 24 for distributing control signals among the various components.

Each of components 10-14 has an associated connection stage 26-30. Each connection stage includes a logic circuit 32-36 including e.g., a microcomputer and a read-only-memory (not shown), which is responsive to the control signals transmitted on bus 24 for providing further control signals (as indicated by the broad arrows) for selectively controlling the conductivity of signal switches and drivers (to be described later) to selectively control the transmission and/or reception of video and audio signal between the associated video components and cable 16. Additionally, a remote control conductor (not shown) is connected between each connection stage and its associated video component, for coupling a remote control signal to the respective video component for controlling its function.

Logic circuit 32 associated with the TV monitor 10 serves as a master logic unit for controlling the operation of the entire entertainment system. The user may transmit commands to the master from a remote control transmitter 38. Transmitter 38 includes a plurality of push buttons for allowing the user to select any component of the entertainment system as a source of audio and video signals and any of the remaining components as a receiver of those signals. In response to received commands, the master logic circuit 32 supplies digital control signals to the remaining logic circuits associated with each of the video components via control bus 24 for controlling the operation of the component entertainment system.

TV monitor 10 includes an internal TV tuner portion for supplying baseband video signal and left and right stereophonic audio signals to buses 18, 20 and 22 and a display and loudspeaker portion for reproducing the video and audio signals from these buses.

Since the frequency of baseband video signals is substantial, i.e., up to 4 MHz, proper terminations must be maintained for the ends of video bus 18. The ends of bus 18 must be terminated in the given characteristic impedance of the coaxial cable (i.e., 75 ohms) in order to minimize video signal reflections which would otherwise manifest themselves as ghosts in a reproduced image. One end of video bus 18 (near connection stage 30 associated with VTR 14) is terminated in its characteristic impedance by a 75 ohm resistor 40.

In accordance with one aspect of the present invention, the other end of bus 18 is terminated in connection stage 26 wherein video signal from the internal TV tuner portion of monitor 10 is applied to bus 18 via a video signal driver 42 in the following manner. Driver 42 has a 75 ohm output impedance (represented by resistor 44). A switch 46 has a first position in which the video signal from the internal TV tuner is supplied to bus 18 via driver 42. If, however, video signal is to be received by monitor 10 from bus 18, switch 46 is caused (by control signals from logic circuit 32) to be in a second position which couples the input of driver 42 to signal ground. In this position, driver 42 maintains its 75 ohm output impedance and advantageously serves as the characteristic impedance termination for this end of video bus 18.

A high input impedance video signal buffer 48 supplies video signal from bus 18 to the display portion of TV monitor 10 for producing an image in response to the video signal from bus 18. Circuit embodiments for driver 42 and buffer 48 are described with respect to FIG. 2.

Connection stage 26 also includes selectively conductive switches 50 and 52 for supplying the left and right stereophonic audio signals from TV monitor 10 to audio buses 20 and 22, respectively in response to control signals from logic circuit 32. Additionally, two high input impedance audio buffers 54 and 56 are connected to audio buses 20 and 22 for supplying audio signal from these buses to an audio amplifying portion (not shown) of TV monitor 10 for subsequent reproduction by loudspeakers 58 and 60.

Connection stages 28 and 30 associated with video signal source 12 and video tape recorder 14 also include audio switches 62, 64 and 66, 68 for applying the stereophonic audio signals from source 12 and video tape recorder 14 to audio buses 20 and 22. Connection stage 30 additionally includes video and audio signal buffers 70, 72 and 74 for applying video and audio signal from buses 18, 20 and 22 to the record inputs of video tape recorder 14. Since these buffers present a high impedance to the signal buses, the signal level of each bus will remain constant regardless of the operating mode of the associated video component.

Figure 2:
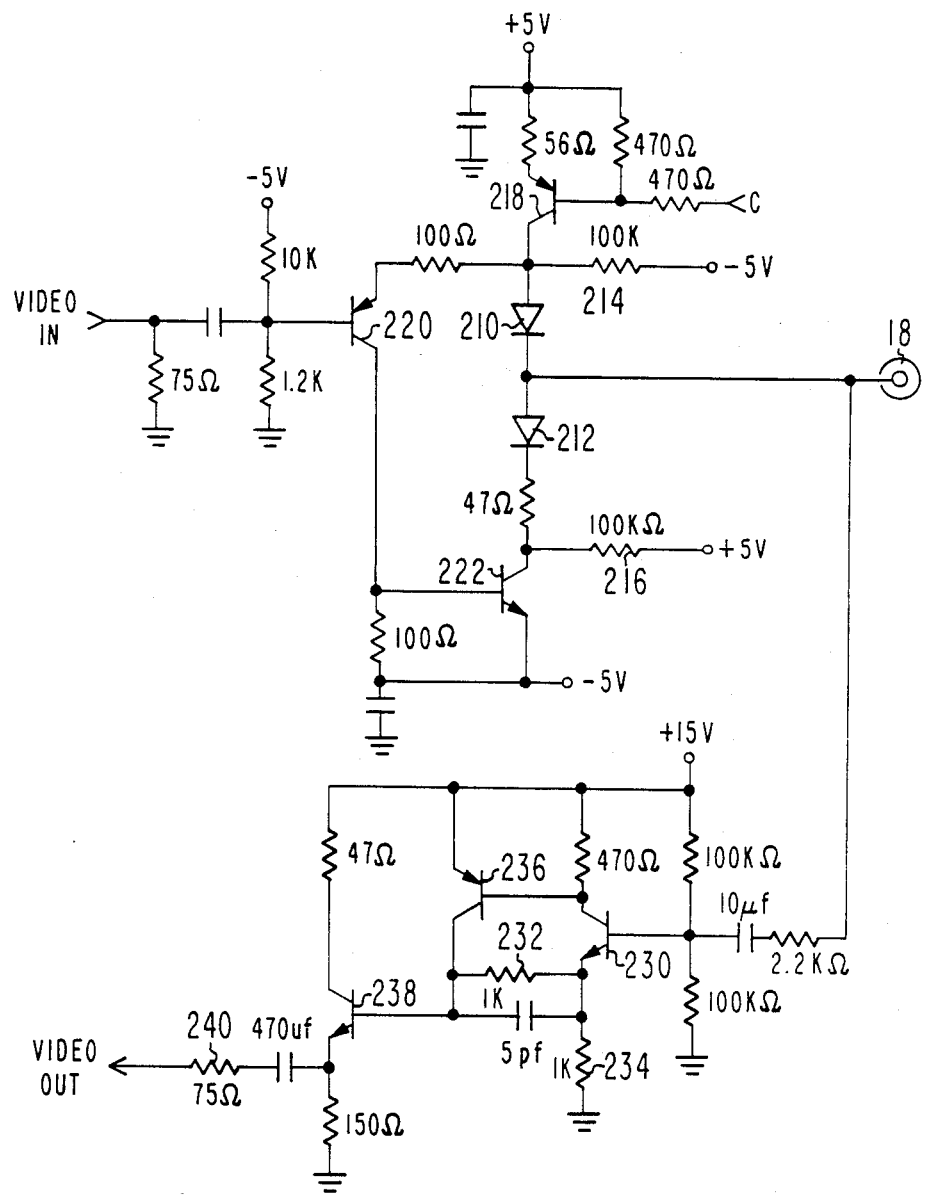
FIGS. 2 and 3 illustrate in schematic diagram form details of portions of FIG. 1.

For supplying a video signal from signal source 12 or from video tape recorder 14 to video bus 18, connection stages 28 and 30 include respective video driver amplifiers 76 and 78 (the circuit embodiments of which are described with respect to FIG. 2). Drivers 76 and 78 are responsive to output signals of logic circuits 34 and 36, respectively, for providing a low output impedance when supplying signal to bus 18 or providing a high output impedance (as functionally represented by the opened series switch of drivers 76 and 78) when not supplying signal to bus 18. The low output impedance (i.e., less than 10 ohms) is desirable in order to supply sufficient signal level to bus 18. The high impedance (i.e., greater than 1k ohm) is desirable at the output of drivers 76 and 78 when they are are not supplying video signal to bus 18, in order to limit the attenuation of video signals on bus 18.

The interconnection system described thus far is relatively simple, requiring only one signal conductor for distributing video signal among the video components and two signal conductors for distributing the stereophonic audio signal. This desirably provides a minimum number of signal conductors, and results in a system that is simple to set-up and operate and is easily expandable. Although a single conductor is used for distributing each of the respective information signals, the system is not restricted to distributing only one signal at a time on each of the respective conductors. Simultaneous and independent signal distribution among the components is provided for in this system by a selectively conductive signal path located in series with each signal bus, which, when non-conductive, separates each signal bus into at least two independently operable sections.

More specifically, connection stage 28 associated with video source 12 includes a switch arrangement 80 coupled in series with video bus 18 which can prevent the distribution of video signal originating from either the internal TV tuner of monitor 10 or the video tape recorder 14 from passing to video source 12 by separating video bus 18 in two separate sections. Switch 80 includes two series connected single-pole, single-throw analog video signal switches 80a and 80b, for allowing video signal from source 12 to be distributed to either of the separated portions of bus 18. Similarly, switches 90 and 92 represent selectively conductive audio signal paths coupled in series with audio buses 20 and 22, respectively, for separating audio buses 20 and 22 into separate sections.

In operation, the user can operate transmitter 38 to transmit commands to master controller 32 which will instruct video tape recorder 14 to record video and audio signals supplied from source 12, while at the same time video and audio signals from the internal TV tuner of monitor 10 will be reproduced by the display and loudspeaker portion of TV monitor 10. This is accomplished by causing switches 80a, 90a and 92a to be non-conductive.

As previously noted, proper termination of the video bus should be maintained at all times to minimize signal reflections. When switch 80a is non-conductive it effectively breaks the continuity of bus 18 into two separate sections, and it is therefore desirable to properly terminate these sections of bus 18 under these conditions. In accordance with a further aspect of the present invention, a shunt switch arrangement is conductive when series switch 80 is non-conductive, so as to properly terminate the ends of the sections of bus 18 formed on respective sides of switch 80 so as to reduce video signal reflections.

More specifically, two more switches 82 and 84, are located on respective sides of switch 80 for coupling bus 18 to a ground reference potential via 75 ohm resistors 86 and 88, respectively, when switches 80a and 80b are non-conductive, respectively. In accordance with the previous example, switch 80 may be used to separate the continuity of bus 18 in order that the display of TV monitor 10 receives video signal from its internal TV tuner, while source 12 supplies signal to the video tape recorder 14. In this case, switch 80b will be conductive so as to pass video signal from source 12 to the video tape recorder 14 and switch 84 will be non-conductive.

However, since switch 80a will be non-conductive so as to prevent intermingling of video signal from the internal TV tuner with signal from source 12, switch 82 will be conductive, so as to terminate the end of video bus 18 which is formed by the non-conduction of switch 80a in its characterisitc impedance. Thus, reflection of the video signal due to the discontinuity presented by the non-conduction of switch 80a is prevented.

In operation, master logic 32 provides output signals to each of the slave logic units, which in turn control the conductivity of each of the previously noted switches and video drivers and the operating function of their associated video component (via previously the noted remote control conductor, not shown), in response to user commands transmitted from remote control transmitter 38. For example, if video signal source 12 was a second TV tuner, the user could instruct master logic 32 that it is desired to view a TV program using the internal tuner of monitor 10 while, at the same time, recording a TV program received from video source 12. The master logic 32 will instruct the slave logic units to supply output signals which:

1. Turn on the appropriate components, i.e., TV monitor 10, video source 12 and video tape recorder 14.

2. Break the continuity of the audio and video buses as appropriate, i.e., open switches 80a, 90a and 92a and close switches 80b, 90b and 92b.

3. Provide proper termination of the video bus, i.e., close switch 82, open switch 84 and operate switch 46 so that the input of driver 42 is coupled to the baseband video signal output of the internal TV tuner of monitor 10 in order that driver 42 serves as a characteristic impedance terminator for bus 18.

4. Select the appropriate operating condition of each component, i.e., set the internal tuner of TV monitor 10 to the desired TV channel and set video signal source 12 to desired TV channel; and 5. Select appropriate signal routing, i.e., enable video signal driver 76 to supply video signal to bus 18 and close audio switches 62 and 64 in order that the video and audio signals from signal source 12 can be coupled to the record inputs of video tape recorder 14 via buffers 70, 72 and 74, and close switches 50 and 52 of connection stage 26 in order to supply the audio signals along with the video signal from driver 42 to TV monitor 10 via video buffer 48 and audio buffers 54 and 46.

The upper portion of FIG. 2 shows an example of circuitry suitable for constructing video drivers 76 and 78. As previously noted, the video driver should be able to be controlled to selectively provide either a low or a high output impedance.

The driver circuitry includes two series connected pin diodes 210 and 212. The junction between diodes 210 and 212 is connected to video bus 18. The diodes are reversed biased by applying −5 volts to the anode of diode 210 via a resistor 214 and +5 volts to the cathode of diode 212 via a resistor 216. A control transistor 218 receives a signal C at its base which, when at a low logic level, causes transistor 218 to conduct and increase the potential at the anode of pin diode 210. This causes diode 210 to become forward biased and provides current to the emitter of transistor 220 biasing it on, so as to conduct the video signal applied at its base to the base of transistor 222. The conduction of transistor 220 biases transistor 222 for conduction which, lowers the potential at the cathode of diode 212, causing it to become forward biased. At this point, the video signal at the base of transistor 220 is coupled to output terminal 18.

Due to the negative feedback provided by the conduction of transistor 220 and diode 210, the output impedance of the video driver is held low (i.e., less than 10 ohms) and its bandwidth is sufficiently wide for passing the baseband video signal (up to 4 MHz).

When the signal C is at a high logic level, transistor 218 is not conductive and the conduction of transistors 220 and 222 is prevented. Thus, pin diodes 210 and 212 remain reverse biased and present a high impedance to video bus 18. Pin diodes are used for establishing the high/low impedance link to bus 18 because of the relatively high impedance they present at video signal frequencies during their reverse bias condition.

The lower portion of FIG. 2 illustrates circuitry suitable for constructing video buffer 70 and video driver 42. In the case of buffer 70, the video signal from bus 18 is applied by emitter follower transistor 230 to the junction of equal valued resistors 232 and 234. An opposite conductivity type transistor 236 clamps the voltage at the collector of transistor 230 to approximately 1 $V_{be}$ below 15 volts for stabilizing its operation with respect to temperature variations. The signal level at the junction of resistors 232 and 234 is substantially equal to the signal level at the base of transistor 230 due to its emitter follower operation. Since resistors 232 and 234 are of equal value, the signal level at the junction of resistor 232 and the base of a transistor 238 is twice the input video signal level. Emitter follower transistor 238 provides the output signal. A 75 ohm resistor 240 provides impedance matching to the video signal input terminal of the associated video component.

When the circuitry of the lower portion of FIG. 2 is used as video driver 42, the base of transistor 230 is connected to switch 46 of FIG. 1 and the 75 ohm resistor 240 corresponds to resistor 44 of FIG. 1. Since the amplifier arrangement has a gain of 2, the 50% reduction in signal amplitude due to the 75 ohm output impedance is compensated for.

Figure 3:
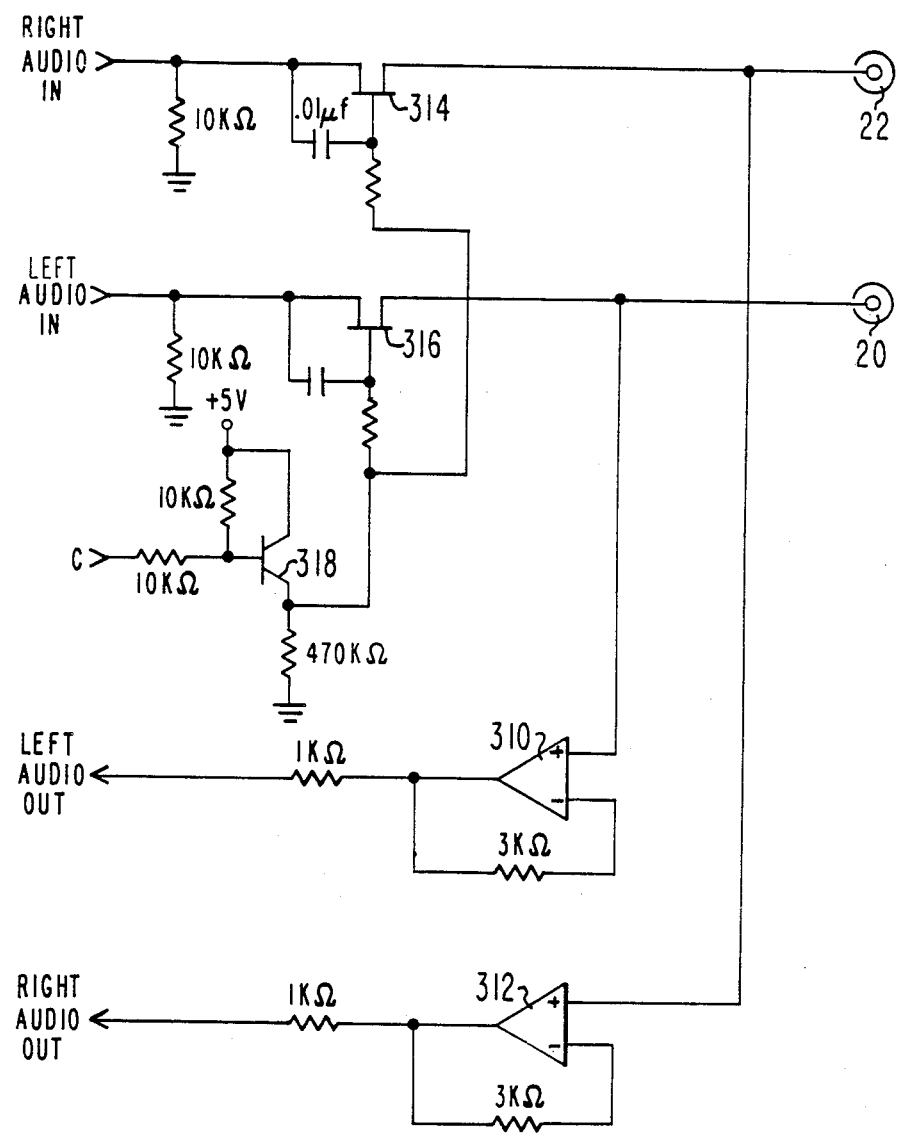

The lower portion of FIG. 3 illustrates circuitry suitable for constructing the audio buffers of the system and the upper portion of FIG. 3 illustrates circuitry suitable for constructing the various audio switches. The left and right audio buffers comprise respective high input impedance FET operational amplifiers 310 and 312, biased for operation as unity-gain followers for applying the audio signals from buses 20 and 22 to the audio input terminals of the associated audio components. The audio switches comprise FET transmission gates, such as 314 and 316 for providing signal paths between the audio output terminals of the associated audio component and the buses 20 and 22. Each transmission gate is enabled to conduct by the conduction of a control transistor 318 in response to the application of a control signal C to its base electrode from the logic unit of the associated connection stage.

Thus, what has been described is an interconnection arrangement for a component entertainment system which has a single signal conductor bus for each of the audio and video signals which connects the individual components in a "daisy-chain" fashion and facilitates user set-up, enhances system reliability and provides for simple expansion for subsequently added components. For allowing simultaneous and independent distribution of the video signal among the video components, a series switch arrangements is provided to break the continuity of the video bus into two separate sections, each section interconnecting different ones of the video components. A shunt switch coupled to the video bus at the point where its continuity is broken, applies a characteristic impedance termination to the bus for reducing signal reflection caused by the discontinuity presented by the series switch. Furthermore, at one end of the video bus, a video signal driver is provided which maintains a given output impedance corresponding to the bus characteristic impedance, when supplying video signal to the bus, and continues to maintain the characteristic impedance so as to terminate the bus in its characteristic impedance, when not supplying video signal to the bus.

While the invention has been illustrated in terms of two series connected switches 80a, b for breaking the continuity of video bus 18 and two switched resistor terminations 82, 86 and 84, 88, it is to be understood that a single series switch such as 80a could be used for breaking the continuity of video bus 18, in which case only one shunt switch arrangement 82, 86 would be required. It is also to be understood that the impedance required to effectively reduce signal reflection on the video bus is not required to be exactly equal to the given characteristic impedance, such as shown in FIG. 1.

What is claimed is:

1. In an interconnection apparatus for separate video components of a home entertainment system including a plurality of connection means, each connection means being associated with a respective one of each of said video components for controlling the supply and/or receipt of video signals to or from its associated video component, and a single video signal transmission path having first and second ends and a given characteristic impedance for coupling together said plurality of connection means at distributed locations at and between said first and second ends and for transferring said video signals therebetween, apparatus for terminating one of said first and second ends of said transmission path in said given characteristic impedance, comprising:

a video signal driver included in the one of said connection means which is coupled to said one of said first and second ends of said transmission path for supplying video signal from the video component associated with said one connection means to said transmission path and having an output impedance substantially equal to said given characteristic impedance when supplying video signal to said transmission path and substantially maintaining said given characteristic impedance when not supplying video signal to said path so as to always terminate said one end of said transmission path in said characteristic impedance and thereby inhibit undesired signal reflections along said transmission path.

2. Apparatus in accordance with claim 1 wherein:
said one connection means includes a switch arrangement having a first position for coupling video signal from its associated video component to the input of said video signal driver for supplying video signal from its associated video component to said transmission path, and a second position for coupling a first reference potential to said input of said video driver so as to maintain said given characteristic impedance as said output impedance for terminating said transmission path in said given characteristic impedance when said video driver is not supplying video signal to said transmission path.

3. The apparatus recited in claim 2 wherein said switch is caused to be in said second position when video signal is being received by its associated video component from said transmission path.

4. In an interconnection apparatus for separate video components of a home entertainment system including a plurality of connection means, each connection means being associated with a respective one of each of said video components for controlling the supply and/or receipt of video signals to or from its associated video component, and a single video signal transmission path having first and second ends and a given characteristic impedance for coupling together said plurality of connection means at distributed locations at and between said first and second ends and for transferring said video signals therebetween, apparatus for terminating one of said first and second ends of said transmission path in said given characteristic impedance, comprising:

a video signal driver having an output impedance substantially equal to said given characteristic impedance and included in the one of said connection means which is coupled to said one of said first and second ends of said transmission path for supplying video signal from the video component associated with said one connection means to said transmission path; and a switch having a first position for coupling video signal from said associated video component to an input of said video signal driver for supplying video signal from said associated video component to said transmission path, and a second position for coupling a first reference potential to said input of said video signal driver so as to maintain said given characteristic impedance as said output impedance for terminating said transmission path in said given characteristic impedance when said video driver is not supplying video signal to said transmission path.

5. The apparatus recited in claim 4 wherein said switch is caused to be in said second position when video signal is being received by said its associated video component from said transmission path.

* * * * *